(12) United States Patent
Lewis et al.

(10) Patent No.: US 10,758,981 B2
(45) Date of Patent: Sep. 1, 2020

(54) ADDITIVELY-MANUFACTURED FLOW RESTRICTORS AND METHODS FOR THE FABRICATION THEREOF

(71) Applicant: HONEYWELL INTERNATIONAL INC., Morris Plains, NJ (US)

(72) Inventors: Steven Alan Lewis, South Bend, IN (US); Gary A. Valencourt, Niles, MI (US); Yathiraj Kasal, Bangalore (IN); Sammuel Tillich, South Bend, IN (US); Elliot Conrad, Decatur, IN (US); Michael J. Spier, Three Rivers, MI (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 4 days.

(21) Appl. No.: 16/037,382

(22) Filed: Jul. 17, 2018

(65) Prior Publication Data

US 2020/0023433 A1 Jan. 23, 2020

(51) Int. Cl.
| | | |
|---|---|---|
| *F16L 55/027* | (2006.01) | |
| *B22F 3/105* | (2006.01) | |
| *B22F 5/10* | (2006.01) | |
| *B33Y 80/00* | (2015.01) | |

(52) U.S. Cl.
CPC ............ *B22F 3/1055* (2013.01); *B22F 5/106* (2013.01); *F16L 55/02736* (2013.01); *B22F 2003/1057* (2013.01); *B33Y 80/00* (2014.12); *F16L 55/027* (2013.01)

(58) Field of Classification Search
CPC .................. F16L 55/27; F16L 55/02718; F16L 55/02754; F02C 9/32; F15D 1/025

USPC .............................................. 138/41, 37, 39
See application file for complete search history.

(56) References Cited

U.S. PATENT DOCUMENTS

| | | | | | |
|---|---|---|---|---|---|
| 3,077,903 | A | * | 2/1963 | Honsinger | ............. G05D 7/012 138/45 |
| 3,109,459 | A | * | 11/1963 | Lee, II | ............. F16L 55/02709 138/40 |
| 4,171,209 | A | * | 10/1979 | Brown | ................... B01D 46/10 138/41 |
| 4,234,008 | A | * | 11/1980 | Cronfel | ..................... F16T 1/34 137/182 |

(Continued)

*Primary Examiner* — Patrick F Brinson
(74) *Attorney, Agent, or Firm* — Lorenz & Kopf, LLP (57) ABSTRACT

Additively-manufactured flow restrictors are provided, as are methods for producing additively-manufactured flow restrictors. In various embodiments, the additively-manufactured flow restrictor includes a flowbody through which a flow path extends, a restricted orifice located in the flowbody and providing a predetermined resistance to fluid flowing along the flow path in a first flow direction, and a first internal perforated screen positioned in the flow path upstream of the restricted orifice taken in the first flow direction. The flowbody and the first internal perforated screen integrally formed as a single additively-manufactured piece utilizing, for example, Direct Metal Laser Sintering (DMLS) or another additive manufacturing process. In certain embodiments, the first internal perforated screen may include an endwall and a peripheral sidewall, which is integrally formed with the endwall and spaced from an inner circumferential surface of the flowbody by an annular clearance.

18 Claims, 5 Drawing Sheets

(56) References Cited

U.S. PATENT DOCUMENTS

| | | | |
|---|---|---|---|
| 4,248,270 A * | 2/1981 | Ostrowski | F16K 31/404 137/504 |
| 4,266,576 A * | 5/1981 | Bradford | F16L 37/025 138/40 |
| 5,511,585 A * | 4/1996 | Lee, II | F15D 1/00 138/41 |
| 9,597,732 B2 | 3/2017 | Lewis et al. | |
| 2016/0215914 A1* | 7/2016 | Lewis | F16L 55/02736 |
| 2017/0239726 A1 | 8/2017 | Palumbo et al. | |
| 2018/0119620 A1* | 5/2018 | Falgareiro | F02C 7/222 |

* cited by examiner

ADDITIVELY-MANUFACTURED FLOW RESTRICTORS AND METHODS FOR THE FABRICATION THEREOF

TECHNICAL FIELD

The following disclosure relates generally to flow restrictors and, more particularly, to additively-manufactured flow restrictors containing unique structural features, such as integral internal screens, as well as to methods for manufacturing such flow restrictors.

BACKGROUND

Flow restrictors are utilized in hydraulic and pneumatic systems to provide predetermined localized resistances to unidirectional and bi-directional fluid flow. Generally, a flow restrictor includes a flowbody, a flow path through the flowbody, and at least one restricted orifice through which the flow path extends. In certain cases, the flow restrictor may also include one or more screens positioned in the flow path upstream of the restricted orifice. For example, a flow restrictor might include a single screen positioned upstream of the restricted orifice in unidirectional flow applications. More commonly, however, two screens are installed on opposing sides of the restricted orifice such that one screen is positioned upstream of the orifice regardless of the flow direction through the restrictor at any particular point in time. Traditionally, a flow restrictor screen assumes the form of a shaped wall or body having perforations therethrough. The perforations are sized to permit the low resistance passage of fluid, while preventing fluid-entrained solid contaminants from reaching and potentially occluding the restricted orifice. Flow restrictor screens are often fabricated as discrete parts or pieces, which are affixed to the flowbody during an assembly process. For example, in one common approach, flow restrictor screens are fabricated from metal sheets, which are perforated, singulated, formed into dome-like shapes, and then secured to the flowbody by brazing.

While relatively straightforward to fabricate, existing flow restrictor designs remain limited in several respects. Conventional flow restrictors are often somewhat costly to manufacture and, in the aggregate, can add non-trivial cost to a pneumatic or hydraulic system containing several flow restrictors distributed throughout the system. Conventional flow restrictors often provide varying levels of flow resistance depending upon the direction of fluid flow through the flowbody, which may be undesirable in certain bidirectional flow applications. Further, in the case of flow restrictors containing prefabricated screens, the screen perforations may be partially covered or blocked by surrounding infrastructure when the screens are installed within the restrictor flowbody. As a result, a certain amount of the flow area through the screen may be non-utilized and, in essence, wasted. It may be possible to compensate for this non-utilized flow area by enlarging the screen perforations or, perhaps, by increasing screen dimensions to accommodate a higher perforation count. Such solutions are less than ideal, however, and may increase the overall size, cost, and weight of the flow restrictor; or can detract from the effectiveness of the screens in blocking the passage of smaller particulate contaminants.

There thus exists an ongoing demand for flow restrictors overcoming most, if not all of the aforementioned limitations. Ideally, such flow restrictors would be amenable to production at reduced manufacturing costs and could be fabricated to have relatively lightweight, compact constructions, particularly in axial dimensions. It would also be desirable if, in at least some embodiments, the flow restrictors could provide highly symmetrical resistance to bi-directional fluid flow through the flow restrictor flowbody. Finally, it is still further desirable to provide methods for fabricating flow restrictors having such favorable characteristics. Other desirable features and characteristics of embodiments of the present disclosure will become apparent from the subsequent Detailed Description and the appended Claims, taken in conjunction with the accompanying drawings and the foregoing Background.

BRIEF SUMMARY

Additively-manufactured flow restrictors are provided. In various embodiments, the additively-manufactured flow restrictor includes a flowbody through which a flow passage or path extends, a restricted orifice located in the flowbody and providing a predetermined resistance to fluid flow along the flow path in a first flow direction, and a first internal perforated screen positioned in the flow path upstream of the restricted orifice in the first flow direction. The flowbody and the first internal perforated screen integrally formed as a single additively-manufactured piece, such as a sintered metal piece produced utilizing a Direct Metal Laser Sintering (DMLS) process. In at least some implementations, the first internal perforated screen may include an endwall and a peripheral sidewall, which is integrally formed with the endwall and which is spaced from an inner circumferential surface of the flowbody by an annular clearance. The sidewall may have an annular or tubular geometry in embodiments, while the endwall may have a conical geometry that converges toward the centerline of the additively-manufactured flow restrictor. In other implementations, the geometry of the endwall and/or peripheral sidewall may vary.

In further embodiments, the additively-manufactured flow restrictor includes a flowbody in which a restricted orifice is located. A flow path extends from first end portion of the flowbody, through the restricted orifice, and to a second, opposing end portion of the flowbody. A first perforated screen is located in the flow path on a first side of the restricted orifice, while a second perforated screen is located in the flow path on a second opposing side of the restricted orifice. The flowbody, the first perforated screen, and the second perforated screen are integrally formed as a single additively-manufactured piece. In certain implementations, the first perforated screen includes an annular or tubular sidewall, which is contained within the flowbody and spaced from an inner peripheral surface thereof by an annular clearance. An annular array of perforations may further be formed through the tubular sidewall in embodiments and circumscribed by the annular clearance.

Methods for fabricating additively-manufactured flow restrictors are further disclosed. In various embodiments, the method includes the step or process of utilizing an additive manufacturing process to fabricate, on a layer-by-layer basis, a flowbody containing a flow path and a restricted orifice through which the flow path extends. The additive manufacturing process is also utilized to further produce a first internal perforated screen within the flowbody, such that the first internal perforated screen and the flowbody are integrally formed as a single additively-manufactured piece. In at least some implementations, the method further includes the step or process of forming the first internal perforated screen to include an endwall, a tubular sidewall integrally formed with the endwall and spaced from an inner circumferential surface of the flowbody by an annular clearance, and perforations formed through the endwall and through the tubular sidewall. The endwall may be imparted with a substantially conical shape in embodiments; and, perhaps, the additively-manufacturing process may be utilized to further form a support arm, which is joined to a vertex of the conical endwall and which extends away therefrom to connect to an interior portion of the flowbody adjacent the endwall.

Various additional examples, aspects, and other useful features of embodiments of the present disclosure will also become apparent to one of ordinary skill in the relevant industry given the additional description provided below.

BRIEF DESCRIPTION OF THE DRAWINGS

At least one example of the present invention will hereinafter be described in conjunction with the following figures, wherein like numerals denote like elements, and.

For simplicity and clarity of illustration, descriptions and details of well-known features and techniques may be omitted to avoid unnecessarily obscuring the exemplary and non-limiting embodiments of the invention described in the subsequent Detailed Description. It should further be understood that features or elements appearing in the accompanying figures are not necessarily drawn to scale unless otherwise stated.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect.

As appearing herein, the term "additively-manufactured flow restrictor" or "AM flow restrictor" refers to a flow restrictor containing a flowbody and at least one perforated screen produced as a single (monolithic) additively-manufactured piece or structure. As further appearing herein, the term "Direct Metal Laser Sintering" or "DMLS" refers to a selective laser sintering process in which a metallic additive manufacturing powder is utilized to produce a desired component. Comparatively, the term "selective laser sintering" or "SLS" refers to any additive manufacturing process in which a laser beam is impinged upon selected regions of powder layers to build-up parts (here, flow restrictors) on a layer-by-layer basis in accordance with computer-readable three dimensional object data. This term encompasses the more specific term "DMLS." Finally, the term "metallic material" refers to a material composed predominately of one or more metallic constituents, by weight percentage.

Figure 1:
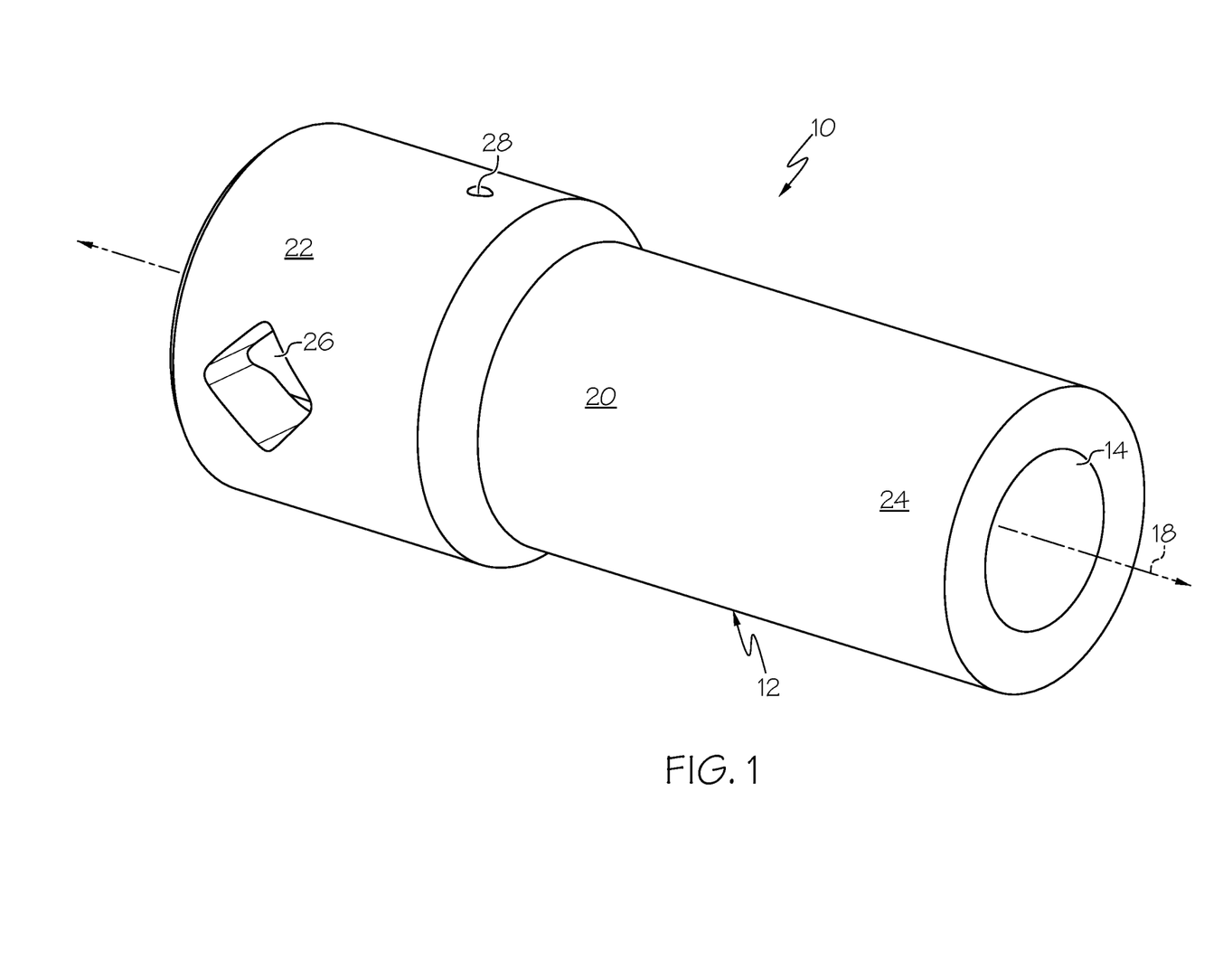
FIGS. 1, 2, and 3 are isometric side, front, and rear views, respectively, of an additively-manufactured flow restrictor including two internal perforated screens and shown in a partially-completed or blank state prior to final machining, as illustrated in accordance with an exemplary embodiment of the present disclosure.
Figure 2:
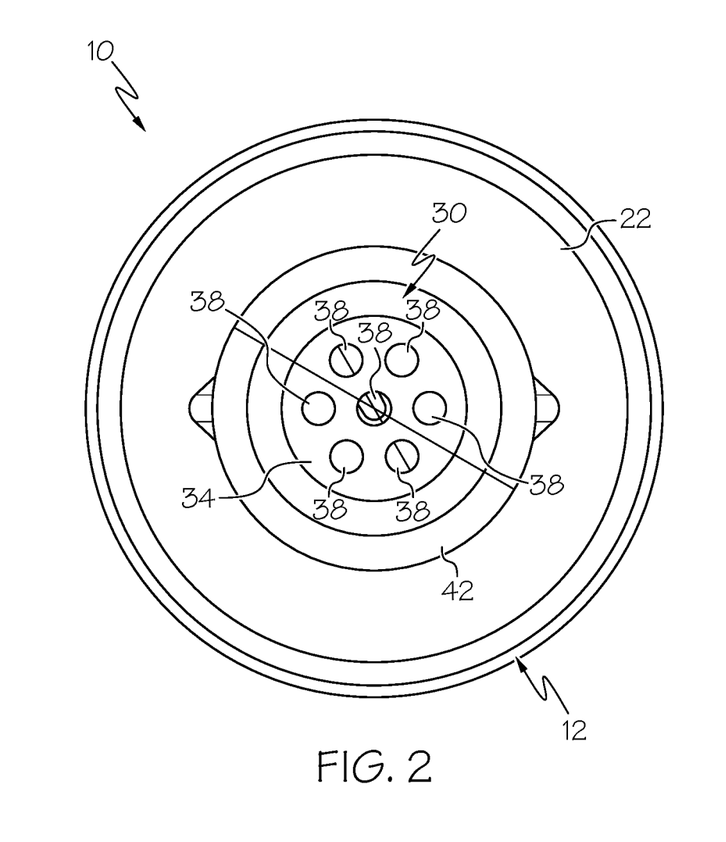
Figure 3:
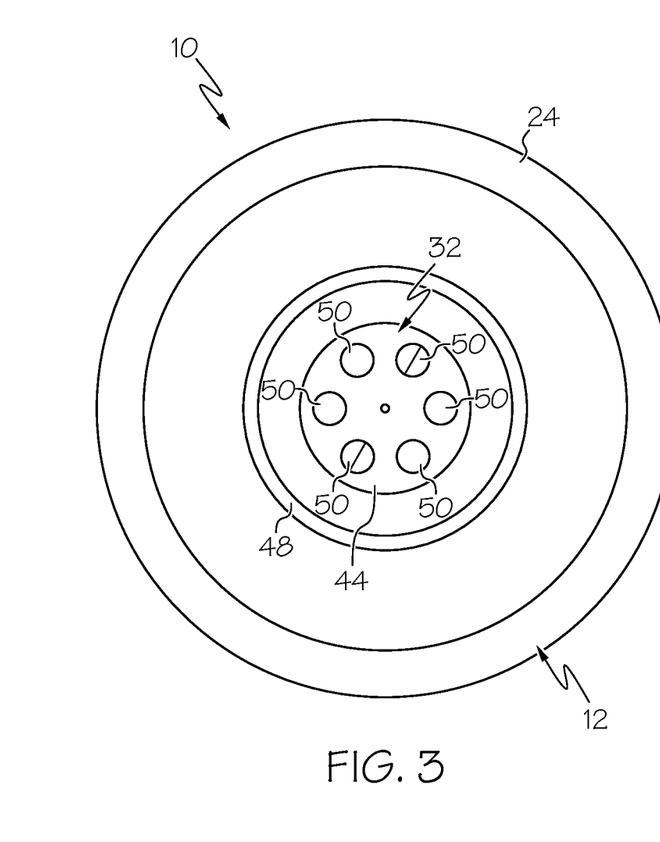

FIGS. 1, 2, and 3 are isometric side, front, and rear views, respectively, of an additively-manufactured (AM) flow restrictor 10, as illustrated in accordance with an exemplary embodiment of the present disclosure. AM flow restrictor 10 is shown in a partially-completed or blank state in FIGS. 1-3 and may be subjected to additional processes (e.g., one or more machining steps) to complete fabrication of restrictor 10, as discussed more fully below. AM flow restrictor 10 includes a flowbody 12, which is generally axisymmetric about a centerline 18 (identified in FIG. 1). Flowbody 12 has an elongated, tubular form factor in the illustrated example, but can be additively produced to have various other form factors in further embodiments, as desired. Flowbody 12 includes a central or intermediate portion 20, a first end portion 22 extending from intermediate portion 20 along centerline 18 in a first direction, and a second end portion 24 extending from intermediate portion 22 is a second direction opposite the first direction. A flow path or passage 14 extends through flowbody 12 along centerline 18 and includes two ports, which are formed in opposing end portions 22, 24. In other implementations, flow passage 14 may follow a more complex, non-linear path through flowbody 12 and can include three or more ports.

When AM flow restrictor 10 is installed within a larger hydraulic or pneumatic system, end portions 22, 24 of flowbody 12 accommodate female connectors or other mating inserts to provide fluid-tight interconnections. For example, in certain cases, a hollow metal pin may be inserted either or both of end portions 22, 24 and expanded (e.g., by physical deformation) to create the desired fluid-tight joints during flow restrictor installation. In further implementations, other types of fluid-tight interconnections can be utilized, in which case end portions 22, 24 of AM flow restrictor 10 may be omitted or structurally modified in an according manner. Furthermore, various types of detailed structural features can be formed through or in conjunction with flowbody end portions 22, 24, as appropriate to suit a particular application or usage. For example, as shown in FIG. 1, one or more viewing windows 26 may be formed through the outer annular wall of end portion 22 to allow visual inspection of a first (or second) internal perforated screen contained with flowbody 12; e.g., internal perforated screen 30, described below. Lastly, one or more key features 26 may be provided for part marking purposes.

Figure 4:
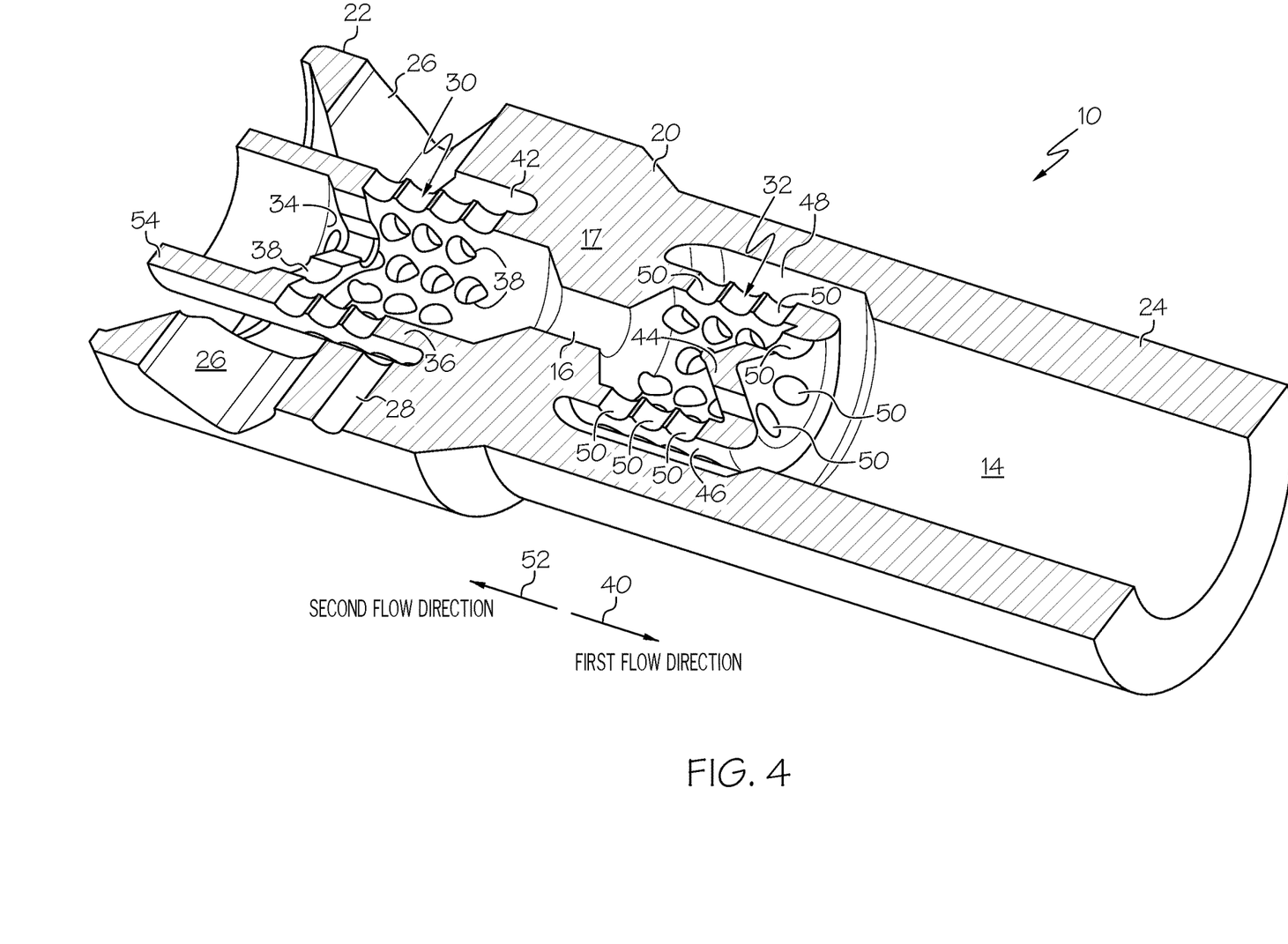
FIG. 4 is an isometric cross-sectional view of the exemplary flow restrictor shown in FIGS. 1-3, as taken along a first section plane containing the centerline of the flow restrictor.

As shown most clearly in FIG. 4, which is an isometric cross-sectional view of AM flow restrictor 10 taken along a section plane containing centerline 18 (FIG. 1), at least one restricted orifice 16 is located within flowbody 12. In the illustrated embodiment, restricted orifice 16 is located in intermediate portion 20 of flowbody 12 and defined by an opening provided through a constricted internal region 17 of flowbody 12. Internal region 17 may, for example, have a geometry somewhat similar to a convergent-divergent nozzle. Stated differently, the inner diameter of internal region 17 may initially taper downwardly or constrict leading into the opening defining restricted orifice 16 and then taper upwardly or expand moving away from orifice 16, as taken in a first flow direction through flowbody 12 (identified in FIG. 4 by arrow 40). Constricted internal region 17 thus defines an inner wall within flowbody 12 through which orifice 16 is formed and from which the below-described internal perforated screens (screens 30, 32) may extend in opposing directions.

Referring collectively to FIGS. 1-4, restricted orifice 16 is shaped and dimensioned to provide a controlled resistance to fluid flow through flow restrictor 10. In the illustrated example, restricted orifice 16 has a generally cylindrical form factor with an inner diameter less than the minimum inner diameter of flow passage 14. In other embodiments, restricted orifice 16 can assume other geometries for providing a controlled resistance to fluid flow, such as that of an annulus. Additionally, in some implementations, AM flow restrictor 10 can be produced to include multiple restricted orifices positioned in parallel or in flow series. Further, while restricted orifice 16 is usefully integrally formed with flowbody 12 and the below-described perforated screens as a single or monolithic additively-produced piece, as shown, this is not necessary in all embodiments. Instead, in alternative implementations, restricted orifice 16 may be defined by a prefabricated component or piece, such as a cylindrical insert, installed within flowbody 12 and affixed in its desired position by brazing, interference fit, or utilizing another technique.

As indicated above, first and second internal perforated screens 30, 32 are further contained in flowbody 12 and positioned in flow passage 14. Perforated screens 30, 32 are considered "internal" in the illustrated embodiment in that screens 30, 32 are located within and fully circumscribed by flowbody 12, as taken along centerline 18 (FIG. 1). In other embodiments, one or both of screens 30, 32 may be external screens, which project from flowbody 12 or are otherwise exposed from the exterior of flowbody 12, as viewed along an axis perpendicular to centerline 18 (FIG. 1). The term "perforated," as appearing herein, refers to any structure through which multiple openings are provided, whether such openings are created during the additive manufacturing process (as will typically be the case) or such openings are subsequently defined by the removal of material during a post-additive machining step. Internal perforated screens 30, 32 and restricted orifice 16 are substantially coaxial in the illustrated example and generally axisymmetric about centerline 18 (FIG. 1). In other embodiments, the relative positioning of internal perforated screens 30, 32 and restricted orifice 16 may vary.

As a point of emphasis, internal perforated screens 30, 32 are integrally formed with flowbody 12 and, perhaps, all other structural features or portions of flow restrictor 10, as a single (that is, monolithic or unitary) additively-manufactured piece or structure. Accordingly, in various embodiments of AM flow restrictor 10, the volume of material encompassing flowbody 12, internal perforated screens 30, 32, and the other features of AM flow restrictor 10 is deposited on a layer-by-layer basis in accordance with computer-readable data during a selected additive manufacturing process. Suitable additive manufacturing processes for fabricating AM flow restrictor 10 include DMLS and, more broadly, SLS processes; and, in one embodiment, AM flow restrictor 10 is produced as a single (monolithic or unitary) sintered metal piece utilizing a DMLS process. Generally, the computer-readable data governing production of AM flow restrictor 10 can contain any suitable file type and will often contain or consist of one or more Computer Aided Design (CAD) files, which may be generated by a part designer utilizing various commercially-available CAD program products. A non-exhaustive list of such commercially-available CAD program products includes TOPSOLID, CATIA, CREO, AUTODESK INVENTOR, SOLIDWORKS, and NX CAD software packages, to list but a few examples. Following the additive manufacturing process, any number of post-additive steps can and often will be performed to define the more detailed features of AM flow restrictor 10, to improve surface finish, and to otherwise refine the physical properties of flow restrictor 10, as discussed more fully below in connection with FIG. 6.

With continued reference to FIGS. 1-4, and as best shown in FIG. 4, internal perforated screens 30, 32 may be positioned on opposing sides of restricted orifice 16. Stated differently, internal perforated screens 30, 32 are positioned upstream and downstream of restricted orifice 16, respectively, when fluid flows through AM flow restrictor 10 in the first flow direction (again, identified in FIG. 4 by arrow 40). As a corollary, internal perforated screens 30, 32 are positioned downstream and upstream of restricted orifice 16, respectively, when fluid flows through AM flow restrictor in a second, opposing flow direction; e.g., the direction further identified in FIG. 4 by arrow 52. Due to this positioning, internal perforated screens 30, 32 may prevent or at least deter solid contaminants, such as larger particulate debris, carried by the fluid flow through flowbody 12 from reaching and potentially occluding restricted orifice 16, regardless of the direction of fluid flow through AM flow restrictor 10. In other embodiments, AM flow restrictor 10 may contain only a single screen, which may be positioned upstream of restricted orifice 16 in embodiments in which only unidirectional flow occurs through AM flow restrictor 10. In other embodiments, AM flow restrictor 10 can include multiple screens positioned in flow series on either (or both) sides of restricted orifice 16.

Figure 5:
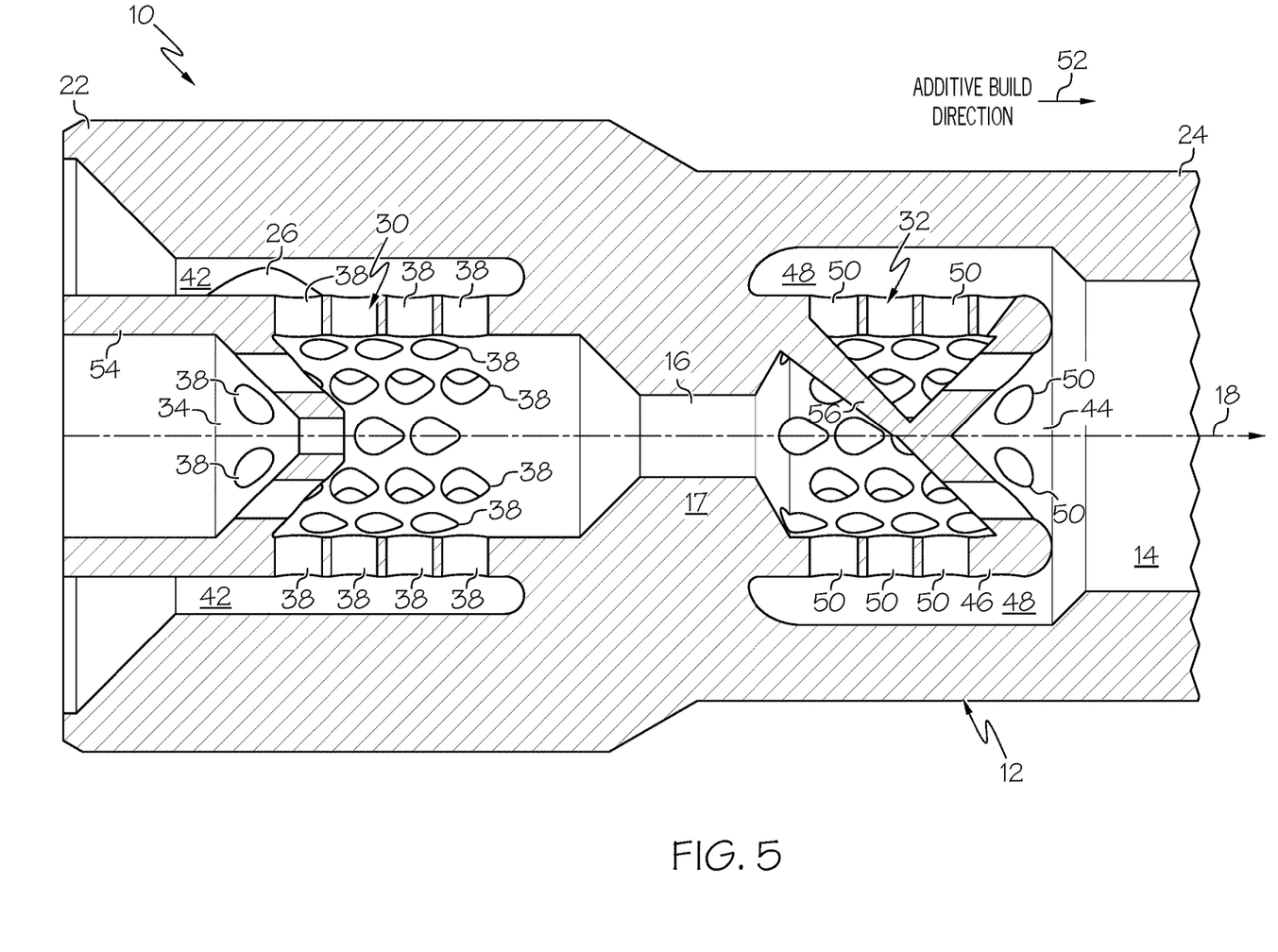
FIG. 5 is a cross-sectional view of a portion of the flow restrictor shown in FIGS. 1-4, as taken along a second section plane parallel to, but offset from the first section plane to more clearly illustrate one manner in which a support arm may be created to support a screen endwall during the additive build process.

Internal perforated screens 30, 32 will now be described in greater detail with reference to FIG. 5, which is a second cross-sectional view of AM flow restrictor 10 taken along a section plane parallel to, but offset from the section plane depicted in FIG. 4. Addressing first screen 30, internal perforated screen 30 includes an endwall 34 and a peripheral sidewall 36. Endwall 34 is joined to and integrally formed with the end portion of peripheral sidewall 36 furthest restricted orifice 16, as taken along centerline 18 (FIG. 1). Peripheral sidewall 36 of internal perforated screen 30 is produced to have a tubular or cylindrical shape in the illustrated example, while endwall 34 has a substantially conical shape. If desired, endwall 34 may be partially or wholly recessed within peripheral sidewall 36. For example, as shown in FIGS. 4-5, at least a volumetric majority of endwall 34 may be recessed within and circumscribed by peripheral sidewall 36. This reduces the axial dimension or length of AM flow restrictor 10, as taken along centerline 18, which may impart flow restrictor 10 with a more compact, lightweight construction. Additionally, recessing or nesting of endwall 34 within peripheral sidewall 36 may shield and protect endwall 34 from physical contact with a mating insert, such as a hollow metal pin. Such a mating insert may be received within end portion 24 of flowbody 12, which may be machined to provide an inner taper for engaging such a hollow metal pin, as discussed more fully below in conjunction with FIG. 6.

As noted above, endwall 34 is advantageously, although non-essentially imparted with a substantially conical geometry. When imparted with such a conical geometry, endwall 34 may be shaped and positioned to converge toward centerline 18 and to terminate in a vertex (peak or nadir) angled toward an additive build direction of flow restrictor 10. The additive build direction of flow restrictor 10 is identified by arrow 52 in FIG. 5. Imparting endwall 34 with such a conical shape may allow additional openings or perforations (e.g., perforations 38,) to be formed through internal perforated screen 30 to allow a higher perforation count, as discussed below. These advantages notwithstanding, endwall 34 of internal perforated screen 30 may be imparted with other geometries in further embodiments, such as a disc-like or domed shape.

A plurality of openings or perforations 38 (only a few of which are labeled in FIGS. 4-5) is provided through endwall 34 and/or peripheral sidewall 36 of internal perforated screen 30. Perforations 38 allow fluid flow through screen 30, while blocking the passage of fluid-entrained contaminants prior to reaching restricted orifice 16 when fluid flows through flowbody 12 in the first flow direction (again, corresponding to arrow 40 in FIG. 4). The number, size, and spatial distribution of perforations 38 will vary amongst embodiments; however, perforations are usefully formed through both endwall 34 and peripheral sidewall 36 to maximize perforation count. Those perforations 38 formed through peripheral sidewall 36 may generally be arranged in a tubular array or spatial distribution, while the perforations 38 formed through endwall 34 may be arranged in one or more concentric rings. The particular size and shape of perforations 38 will vary amongst embodiments; however, by way of non-limiting example, perforations 38 may be produced as circular openings having diameters ranging from about 3 millimeter to about 6 millimeter in an embodiment.

As shown in FIGS. 4-5, peripheral sidewall 36 is spaced from an inner circumferential surface of flowbody 12 by an annular clearance 42. Annular clearance 42 allows the entirety of peripheral sidewall 36 to be availed for accommodation of perforations 38, thereby further allowing the perforation count to be maximized. In certain embodiments, outer annular wall of end portion 22 bounding annular clearance 42 may be subsequently removed by machining, however, in which case internal perforated screen 30 may be referred to as "perforated screen 30," as discussed below in conjunction with FIG. 6. Additionally, as noted above, endwall 34 of internal perforated screen 30 may accommodate a greater number of perforations 38 when formed to have a conical geometry as described above. By maximizing perforation count in this manner, the part designer is imparted with greater flexibility in sizing perforations 38 to have reduced dimensions to impeded the passage of smaller particulate contaminants; and/or to reduce the overall size and weight of AM flow restrictor 10 without impacting the performance thereof.

In the illustrated example, internal perforated screens 30, 32 are similar or substantially identical. Thus, as does internal perforated screen 30, internal perforated screen 32 includes an endwall 44, a peripheral sidewall 46 integrally formed with endwall 44 and spaced from an inner circumferential surface of flowbody by an annular clearance 48, and a plurality of perforations 50 formed through endwall 44 and sidewall 46. As was previously the case, peripheral sidewall 46 is imparted with a tubular or annular shape, while endwall 44 is imparted with a generally conical shape. Endwall 44 is again largely or wholly recessed within, and therefore circumscribed by, peripheral sidewall 46. Flowbody 12 thus circumscribes annular clearance 48, which, in turn, circumscribes peripheral sidewall 46. Again, such a geometry allows the axial dimension or length of flow restrictor 10 to be minimized, while optimizing perforation count. Internal perforated screens 30, 32 are positioned on opposing sides of a plane orthogonal to centerline 18 and transecting restricted orifice 16. Concurrently, internal perforated screens 30, 32 (and, specifically, tubular sidewalls 36, 46) extend in opposing directions from internal flowbody wall 17 through which restricted orifice 16 is formed. Internal perforated screens 30, 32 may or may not substantially equivalent perforation counts. The similarity between internal perforated screens 30, 32, and the manner in which screens 30, 32 are oriented as mirror opposites on opposing sides of orifice 16, imparts AM flow restrictor 10 with a highly symmetric flow resistance through flowbody 12, as may be desirable in bidirectional flow applications.

As noted above, internal perforated screens 30, 32 are usefully, although non-essentially formed to be similar or essentially identical. However, as internal perforated screen 32 is oriented opposite internal perforated screen 30, this creates a potential issue in producing endwall 44 during the selective additively manufacturing process due to the manner in which endwall 44 extends from an end portion of peripheral sidewall 46 toward orifice 16 opposite additive build direction 52. Thus, as AM flow restrictor 10 is additively compiled on a layer-by-layer basis in build direction 52 (from left to right in FIG. 5), the peak or vertex of endwall 44 would initially be unsupported when first produced, absent the provision of a reinforcement structure extending from an internal portion of AM flow restrictor 10 to the peak or vertex of endwall 44 in build direction 52. Such a reinforcement structure is shown in FIG. 5 in the form of an angled support arm 56. As can be seen, support arm 56 extends from an internal portion of flowbody 12 (specifically, from a region adjacent the juncture between peripheral sidewall 46 and inner wall 17) to join the vertex or peak of endwall 44. Support arm 56 thus ensures that endwall 44 remains supported during additive manufacture of AM flow restrictor 10 until the outer periphery of endwall 44 is connected to sidewall 46 in the manner shown in FIGS. 4-5.

During production, AM flow restrictor 10 may be compiled on a layer-by-layer basis in build direction 52 utilizing any suitable additive manufacturing or three dimensional printing process. In many cases, the selected additive manufacturing process will involve a metallic source material (e.g., supplied as a filament (wire), powder bed, actively-flowed powder, or the like) utilizing a suitable heat input source (e.g., a laser or an electron beam), which creates weld pools to fuse together the source material in a targeted manner and thereby gradually build-up the desired component (here, flow restrictor 10). In further implementations, other additive manufacturing processes, such as stereolithography, may be utilized to produce AM flow restrictor 10 from metallic materials, non-metallic materials, or a combination thereof. One process well-suited for producing AM flow restrictor 10 from metallic materials is DMLS. Generally, during DMLS, a targeted laser beam is directed against targeted regions of a powder bed to fuse selected regions of a first metallic powder layer, a fresh metallic powder layer is then applied utilizing a recoater, appropriate regions of the fresh powder layer are then impinged with the laser beam and fused, and this process is repeated to compile AM flow restrictor 10.

Any number and type of additional processes may be performed following the DMLS process or other additive manufacturing process utilized to initially produce AM flow restrictor 10. For example, heat treatment may be performed to reduce material stresses, to anneal the newly-produced part, or for other purposes. A chemical treatment may be carried-out to improve surface finish by removing surface asperities typical of additive manufacturing processes; e.g., AM flow restrictor 10 may be submerged in a chemical etchant bath with agitation for a period of time on the order of several minutes. De-burring can be conducted, as appropriate, by tumbling or otherwise mixing AM flow restrictor 10 with abrasive media. Passivation may performed to remove active iron from the surface of AM flow restrictor 10 and thereby improve corrosion protection when AM flow restrictor 10 is composed of steel. Additional machining may be performed to define the more detailed structural features of AM flow restrictor 10, if needed; and any desired coatings may be applied.

Figure 6:
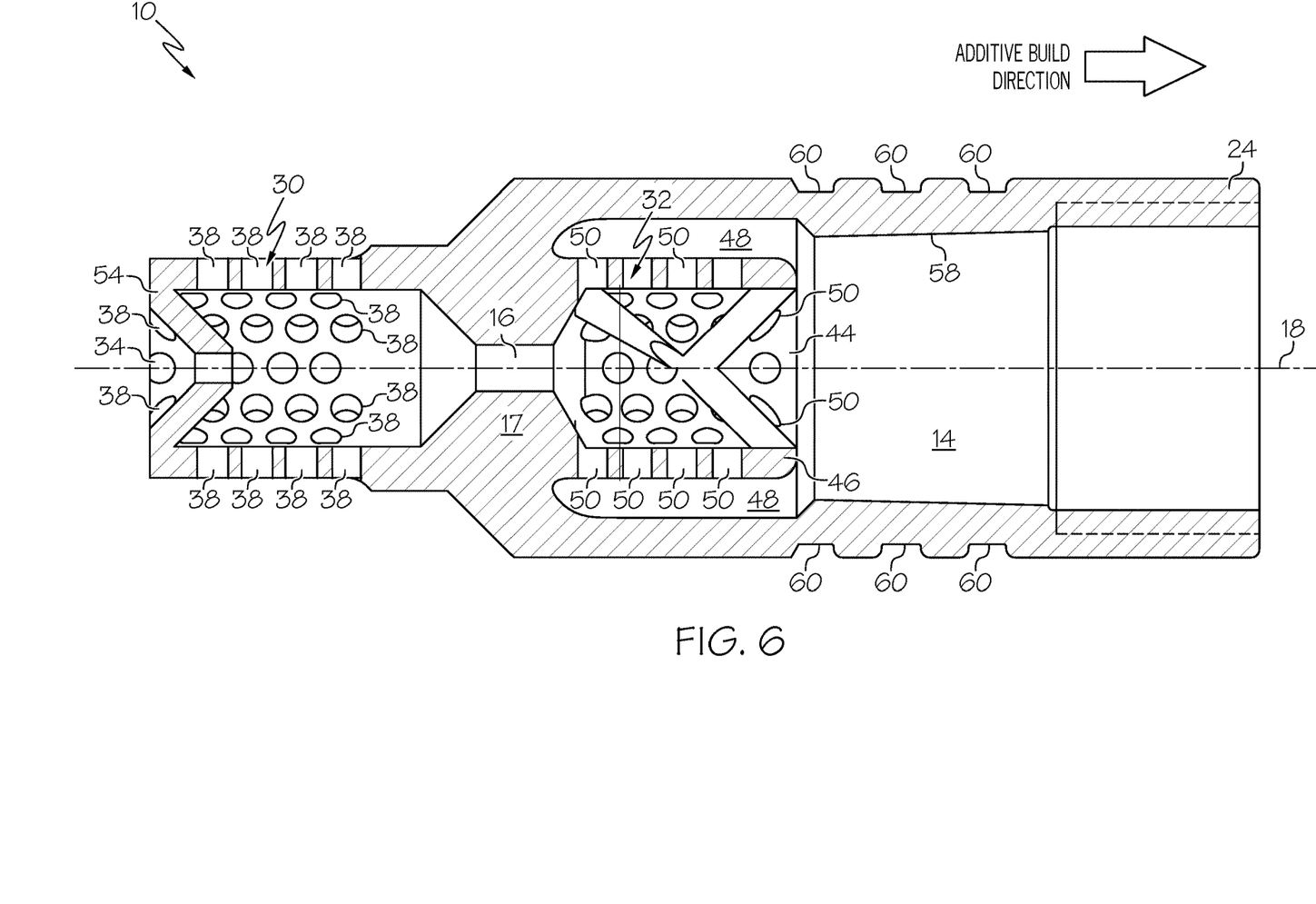
FIG. 6 is a cross-sectional view of the exemplary flow restrictor of FIGS. 1-5, as shown in a completed state after final machining.

FIG. 6 is a cross-sectional view of flow restrictor 10, as shown in its completed state after final machining. As may be appreciated by comparing FIG. 6 to FIGS. 4-5, certain sacrificial portions of flow restrictor 10 have been removed by machining. For example, inner tubular extension 54 (FIG. 4), which previously extended from internal perforated screen 30 in a direction away from orifice 16 to terminate at a common plane with end portion 22 of flowbody 12, has now been removed. So too has a substantial portion of the outer annular sidewall of end portion 22 been removed to expose perforated screen 30 from the exterior of flow restrictor 10. For this reason, perforated screen 30 is no longer be considered as an "internal screen"; however, perforated screen 30 remains largely contained or shrouded within flowbody 12 and, therefore, remains an "internal screen" in the completed component. Machining has also been performed to refine the inner and outer peripheral surfaces of end portion 24 of flowbody 12 with desired dimensions and geometries. Specifically, the inner peripheral or circumferential surface 58 of end portion 24 has been machined to now define a step or "neckdown" feature and an inner taper or draft, which tapers downwardly in inner diameter when moving toward internal perforated screen 30 from the outermost terminal end of flowbody portion 24. This inner taper facilitates joinder to a mating connector (e.g., a hollow metal pin), which may be inserted into end portion 24 and expanded to form the desired fluid-tight joint, as previously described. One or more outer annular grooves 60 may also be formed in the outer periphery of flowbody end portion 24, if desired, to accommodate O-rings for sealing purposes.

The foregoing has thus provided an AM flow restrictors achieving several advantages over conventional flow restrictors, particularly flow restrictors containing prefabricated screens. Relative to such conventional flow restrictors, which typically require brazing and other processing steps related to screen installation, embodiments of the AM flow restrictor can be fabricated with greater efficiencies and at significantly reduced costs; e.g., in certain instances, the AM flow restrictor can be produced at less than half the cost of existing flow restrictors of equivalent dimensions and containing prefabricated screens. Embodiments of the AM flow restrictor can also be imparted with relatively lightweight, compact constructions, particularly in embodiments in which the AM flow restrictor contains one or more screens including an endwall (e.g., a conical endwall) recessed within a tubular sidewall as described above. As a still further advantage, embodiments of the above-described flow restrictors can provide highly symmetrical resistance to bi-directional fluid flow through the flow restrictor flowbody. Methods for fabricating flow restrictors having such favorable characteristics have also been provided.

In various embodiments, the additively-manufactured flow restrictor includes a flowbody having a first end portion and a second end portion opposite the first end portion. A restricted orifice is contained in the flowbody, while a flow path extends from first end portion of the flowbody, through the restricted orifice, and to the second end portion of the flowbody. A first perforated screen is located in the flow path on a first side of the restricted orifice, and a second perforated screen is located in the flow path on a second opposing side of the restricted orifice. The flowbody, the first perforated screen, and the second perforated screen are integrally formed as a single additively-manufactured piece utilizing, for example, a DMLS process. Furthermore, in certain implementations, the flowbody includes a tubular sidewall and a centerline, which is substantially coaxial with the tubular sidewall. In such embodiments, at least a majority of the first perforated screen is circumscribed by the tubular sidewall, as taken along the centerline, while being spatially offset therefrom by a circumferential or annular clearance.

Terms such as "comprise," "include," "have," and variations thereof are utilized herein to denote non-exclusive inclusions. Such terms may thus be utilized in describing processes, articles, apparatuses, and the like that include one or more named steps or elements, but may further include additional unnamed steps or elements. The terms "first," "second," and the like are utilized herein to denote order of introduction during the course of description and may thus vary from the foregoing Detailed Description to the appended Claims to reflect changes in order of introduction. For example, in the following Claims section and with reference to the example of FIG. 6, internal perforated screen 32 may be referred to as a "first internal perforated screen," while perforated screen 30 is referred to as a "second perforated screen"; or, conversely, perforated screen 30 may be referred to as a "first perforated screen," while perforated screen 32 is referred to as a "second internal perforated screen," where appropriate.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. An additively-manufactured flow restrictor, comprising:
a flowbody through which a flow path extends;
a restricted orifice located in the flowbody and providing a predetermined resistance to fluid flow along the flow path in a first flow direction; and
a first internal perforated screen positioned in the flow path upstream of the restricted orifice taken in the first flow direction, the flowbody and the first internal perforated screen integrally formed as a single additively-manufactured piece, and the first internal perforated screen comprises an endwall and a peripheral sidewall integrally formed with the endwall and spaced from an inner circumferential surface of the flowbody by an annular clearance.

2. The additively-manufactured flow restrictor of claim 1 wherein the first internal perforated screen further comprises perforations formed through the endwall and through the annular sidewall.

3. The additively-manufactured flow restrictor of claim 1 wherein the endwall is recessed within the peripheral sidewall.

4. The additively-manufactured flow restrictor of claim 1 wherein the endwall has a substantially conical shape, which converges toward a centerline of the flowbody.

5. The additively-manufactured flow restrictor of claim 1 wherein at least a volumetric majority of the endwall is circumscribed by the peripheral sidewall.

6. The additively-manufactured flow restrictor of claim 1 wherein the endwall comprises a vertex, which is angled toward a build direction of the additively-manufactured flow restrictor.

7. The additively-manufactured flow restrictor of claim 6 wherein the first internal perforated screen further comprises a support arm joined to the vertex and extending away therefrom in a direction opposite the build direction.

8. The additively-manufactured flow restrictor of claim 1 further comprising a second perforated screen further contained in the flowbody and positioned in the flow path downstream of the restricted orifice, as taken in the first flow direction;
wherein the flowbody, the first internal perforated screen, and the second perforated screen are integrally formed as a single additively-manufactured piece.

9. The additively-manufactured flow restrictor of claim 8 wherein the first internal perforated screen comprises a first conical endwall converging toward a centerline of the flowbody in a first direction; and
wherein the internal perforated screen comprises a second conical endwall converging toward a centerline of the flowbody in a second direction opposite the first direction.

10. The additively-manufactured flow restrictor of claim 8 wherein the first internal perforated screen and the second perforated screen are opposed about a plane orthogonal to a centerline of the flowbody and transecting the restricted orifice.

11. The additively-manufactured flow restrictor of claim 8 wherein the single additively-manufactured piece is composed of metal particles sintered on a layer-by-layer basis in a build direction substantially coaxial with a centerline of the flowbody.

12. An additively-manufactured flow restrictor, comprising:
a flowbody, comprising:
a first end portion;
a second end portion opposite the first end portion;
a restricted orifice between the first and second end portions; and
a flow path extending from first end portion of the flowbody, through the restricted orifice, and to the second end portion of the flowbody;
a first perforated screen located in the flow path on a first side of the restricted orifice, the first perforated screen comprises a tubular sidewall separated from an inner peripheral surface of the flowbody by an annular clearance, and an annular array of perforations formed through the tubular sidewall and circumscribed by the annular clearance; and
a second perforated screen located in the flow path on a second opposing side of the restricted orifice,
wherein the flowbody, the first perforated screen, and the second perforated screen are integrally formed as a single additively-manufactured piece.

13. The additively-manufactured flow restrictor of claim 12 wherein the first perforated screen comprises a first conical endwall angled toward an additive build direction of the additively-manufactured flow restrictor, and wherein the first perforated screen comprises a first conical endwall angled away from the additive build direction.

14. The additively-manufactured flow restrictor of claim 12 wherein the flowbody comprises a constricted inner region defining the restricted orifice, and wherein the first and second perforated screens extend from the constricted inner region in opposing directions.

15. The additively-manufactured flow restrictor of claim 12 wherein the flowbody comprises a tubular sidewall and a centerline, which is substantially coaxial with the tubular sidewall; and
wherein, as taken along the centerline, at least a majority of the first perforated screen is circumscribed by the tubular sidewall, while being spatially offset therefrom by a circumferential clearance.

16. A method for fabricating an additively-manufactured flow restrictor, comprising:
utilizing an additive manufacturing process to form, on a layer-by-layer basis, a flowbody through which a flow path extends and a restricted orifice located in the flowbody and providing a predetermined resistance to fluid flow along the flow path in a first flow direction; and
further utilizing the additive manufacturing process to form a first internal perforated screen positioned in the flow path upstream of the restricted orifice taken in the first flow direction, the first internal perforated screen and the flowbody are integrally formed as a single additively-manufactured piece and the first internal perforated screen comprises an endwall and a peripheral sidewall integrally formed with the endwall and spaced from an inner circumferential surface of the flowbody by an annular clearance.

17. The method of claim 16 further comprising forming the first internal perforated screen to comprise:
perforations formed through the endwall and through the tubular sidewall.

18. The method of claim 17 further comprising forming the first internal perforated screen such that the endwall is at least partially recessed within the tubular sidewall.

* * * * *